(12) United States Patent
Hsu

(10) Patent No.: US 7,243,220 B2
(45) Date of Patent: Jul. 10, 2007

(54) NETWORKING APPARATUS AND METHOD CAPABLE OF WAKE-ON-LAN AFTER IMPROPER SHUTDOWN

(75) Inventor: Li-Chih Hsu, Sindian (TW)

(73) Assignee: VIA Technologies, Inc., Taipei (TW)

( * ) Notice: Subject to any disclaimer, the term of this patent is extended or adjusted under 35 U.S.C. 154(b) by 485 days.

(21) Appl. No.: 10/744,020

(22) Filed: Dec. 23, 2003

(65) Prior Publication Data
US 2005/0033955 A1 Feb. 10, 2005

(30) Foreign Application Priority Data
Aug. 4, 2003 (TW) .............................. 92121310 A

(51) Int. Cl.
*G06F 9/00* (2006.01)
(52) U.S. Cl. .............................. 713/1; 713/2; 713/300
(58) Field of Classification Search ................ 713/100, 713/300, 320, 324, 340, 1, 2
See application file for complete search history.

(56) References Cited

U.S. PATENT DOCUMENTS

| | | | |
|---|---|---|---|
| 5,930,192 A * | 7/1999 | Ishikawa | 365/229 |
| 6,266,696 B1 * | 7/2001 | Cromer et al. | 709/224 |
| 6,393,570 B1 * | 5/2002 | Henderson et al. | 713/310 |
| 6,421,782 B1 * | 7/2002 | Yanagisawa et al. | 726/4 |
| 6,640,105 B1 * | 10/2003 | Shin | 455/453 |
| 6,760,850 B1 * | 7/2004 | Atkinson et al. | 713/320 |
| 6,934,870 B1 * | 8/2005 | Amos | 713/501 |
| 7,017,056 B1 * | 3/2006 | Lettang et al. | 713/310 |
| 2003/0126486 A1 * | 7/2003 | Bui | 713/320 |
| 2003/0167413 A1 * | 9/2003 | Stachura et al. | 713/300 |
| 2004/0185892 A1 * | 9/2004 | Iacono et al. | 455/522 |
| 2004/0268111 A1 * | 12/2004 | Dayan et al. | 713/2 |
| 2005/0060587 A1 * | 3/2005 | Hwang et al. | 713/300 |
| 2006/0184813 A1 * | 8/2006 | Bui | 713/320 |

\* cited by examiner

*Primary Examiner*—Thomas Lee
*Assistant Examiner*—Malcolm D Cribbs
(74) *Attorney, Agent, or Firm*—Thomas, Kayden, Horstemeyer & Risley

(57) ABSTRACT

A networking apparatus and method capable of wake-on-LAN after improper shutdown, used in a networked device. The networking apparatus at least comprises a physical layer and a medium access control (MAC) layer. When the MAC layer detects that the networked device is going to shutdown the MAC layer outputs a reset signal to the physical layer or to the switch electrically connected to the physical layer. The physical layer resets according to the reset signal. After the reset, the network apparatus operates in a lower predetermined baud, so that the networked device has the enough power to execute the wake-on-LAN function.

6 Claims, 6 Drawing Sheets

NETWORKING APPARATUS AND METHOD CAPABLE OF WAKE-ON-LAN AFTER IMPROPER SHUTDOWN

This application claims the benefit of Taiwan application Serial No. 92121310, filed Aug. 4, 2003.

BACKGROUND OF THE INVENTION

1. Field of the Invention

The invention relates in general to a networking apparatus, and more particularly to a networking apparatus, within which the wake-on-LAN function can still work properly even in situations of improper shutdown, used in a networked device (e.g. a personal computer or a mobile phone with WAP).

2. Description of the Related Art

Wake-on-LAN is already a necessary function for general 10/100 MHz network cards. Wake-on-LAN functions can be categorized into three types: wake-on-LAN before power management, wake-on-LAN in power management, and wake-on-LAN for improper shutdown.

General power management for networked devices (for example, personal computers) adopts the advanced configuration and power interface (ACPI) standard. Before a networked device has booted up, the power supply unit provides a 3.3V auxiliary power for other peripheral devices to wake up the networked device; at this moment, the PCI slots of the networked device does not have 5V power supply, yet.

The first type of wake-on-LAN before power management function allows the network card, which has just been installed into the networked device and the driver of the network card has not yet been installed, that has inbuilt wake-on-LAN function to wake up the networked device by receiving the packets, which are called magic packets, used to wake up the networked device.

The second type of wake-on-LAN function allows the network card to wake up the networked device that had been properly shut down.

The third type of wake-on-LAN function allows the network card to wake up the networked device that had been improperly shut down.

Common 10/100 MHz network cards support all three of the wake-on-LAN functions. However, 1 GHz network cards still cannot support the third wake-on-LAN function due to large power required. In other words, the power supply unit does not provide enough power to allow the networked device to be awoken by the 1 GHz network cards.

SUMMARY OF THE INVENTION

The invention provides a networking apparatus and method for which the wake-on-LAN function can still work properly even in situations of improper shutdown.

The invention provides a networking apparatus, within which the wake-on-LAN function can still work properly even in situations of improper shutdown, used in a networked device. The networking apparatus comprises at least a physical layer and a medium access control (MAC) layer. When the MAC layer detects that the networked device is shutting down, it sends a reset signal to the physical layer or relevant switch. Once the reset signal is received, the physical layer or the relevant switch is reset, which makes the networking apparatus to operate in a lower baud, so that there is enough power for the wake-on-LAN function to work properly.

Other objects, features, and advantages of the invention will become apparent from the following detailed description of the preferred but non-limiting embodiments. The following description is made with reference to the accompanying drawings.

DETAILED DESCRIPTION OF THE INVENTION

When the networked device has not yet booted up, for the common specification, only 3.3V auxiliary power supply is supplied and the maximum current is 375 mA, but that is insufficient to activate the wake-on-LAN function for 1 GHz network cards.

The baud of the network card is configured using, for example, the external resistor of the network chip or jumpers; therefore, after the network card is reset, it operates at a predetermined baud. General 1 GHz network cards have predetermined bauds less than 1 GHz so that the auxiliary power can be sufficiently used to wake up the networked device. When a 1 GHz network card has just started up, it operates at lower baud that can then be reset back to 1 GHz after the operating driver has been loaded.

The 1 GHz network card has to operate at 10/100 MHz bauds before power management because the operating system has not yet been loaded. Due to lower power consumption when operating at 10/100 MHz, the network card's first wake-on-LAN function can work properly.

In normal operating condition, the operating system can set the baud of the network card to 10/100 MHz before it is properly shut down, therefore the second wake-on-LAN function can also work properly.

However, improperly shutdown keeps the network card retaining its baud at 1 GHz, which is the same as the baud before the shutdown occurred, and hence the power supply unit could not provide sufficient power for the third wake-on-LAN function.

This invention aims to detect improper shutdown of the networked device, and reset the baud of the network card back to 10/100 MHz before the shutdown.

Figure 1:
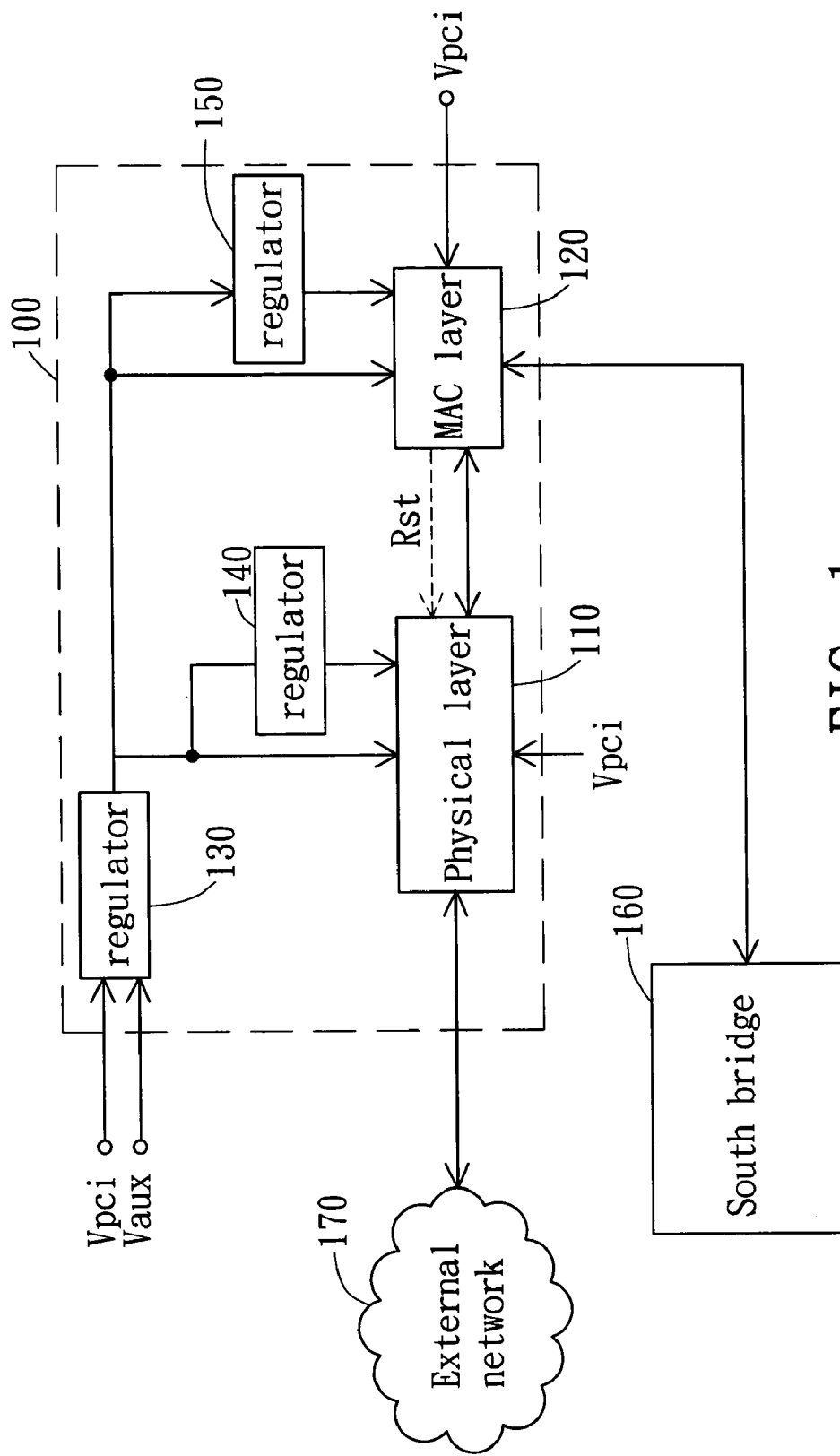
FIG. 1 is a diagram of a networking apparatus, within which the wake-on-LAN function can still work properly even in situations of improper shutdown, according to a first embodiment of the invention.

FIG. 1 is a diagram of a networking apparatus, within which the wake-on-LAN function can still work properly even in situations of improper shutdown, according to a first embodiment of the invention. The networking apparatus 100 in this embodiment is PCI interfaced and is installed in a PCI slot of the networked device. The networking apparatus 100 includes at least a physical layer 110, a medium access control (MAC) layer 120, regulators 130, 140, and 150. The networking apparatus 100 communicates with the south bridge 160 of the networked device through the MAC layer 120. The MAC layer 120 communicates with external network 170 through the physical layer 110.

The primary power supply Vpci provides 5V power to PCI slots when the networked device is on; the auxiliary power supply Vaux provides 3.3V power no matter the networked device is on or off. The networking apparatus 100 receives the power supplies Vpci and Vaux from the PCI slot, and assign different voltage to the physically layer 110 and MAC layer 120 through the regulators 130, 140, and 150. For example, the output voltage of the regulator 140 is 1.5V, and the output voltage for the regulator 150 is 2.5V.

The method that the networking apparatus 100 used to detect whether the networked device is properly shut down is that the MAC layer 120 checks if the primary power supply Vpci dropped from the 5V to a threshold voltage (e.g. 2.5V)—if yes, it means that the networked device is shutting down, therefore the MAC layer 120 sends a reset signal Rst to the physical layer 110. After the reset, the physical layer 110 operates at 10/100 bauds and therefore the wake-on-LAN function of the networking apparatus 100 can work properly—the aim of the invention is achieved.

Figure 2:
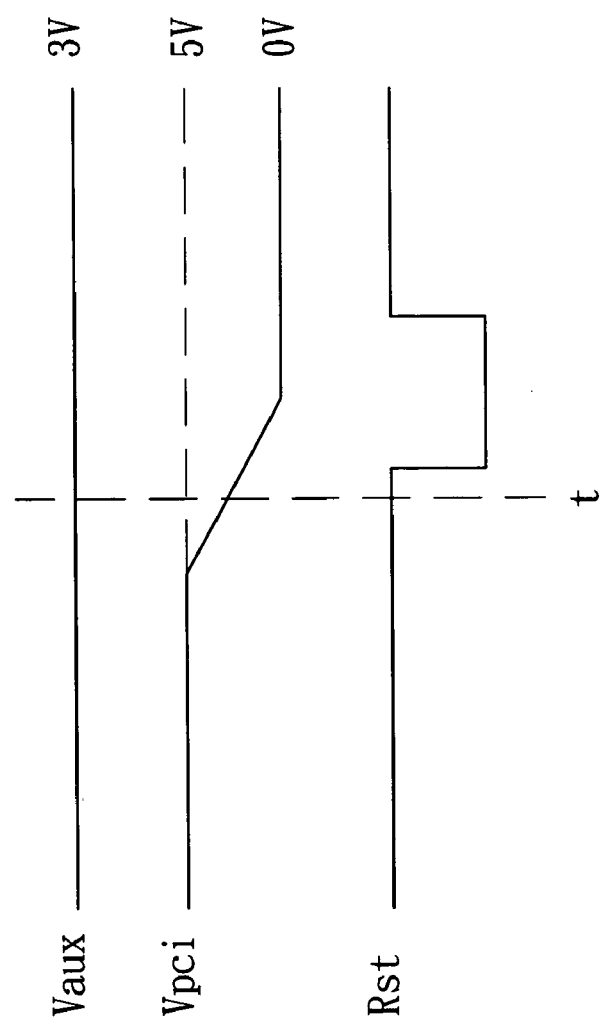
FIG. 2 is a diagram showing the voltages of the first embodiment of the networking apparatus.

FIG. 2 is a diagram showing the voltages of the first embodiment of the networking apparatus. When the networking apparatus is on, power Vpci and Vaux are 5V and 3V respectively. When the MAC layer 120 detected, at the time point t, that Vpci has dropped to the threshold voltage (e.g. 2.5V), which means that the networked device is shutting down, and the MAC layer 120 then pulls low the reset signal Rst which reset the physical layer 110 once received. After the reset, the physical layer 110 operates at 10/100 bauds, in which the power consumption is low, and the wake-on-LAN function of the networking apparatus can work properly.

Figure 3:
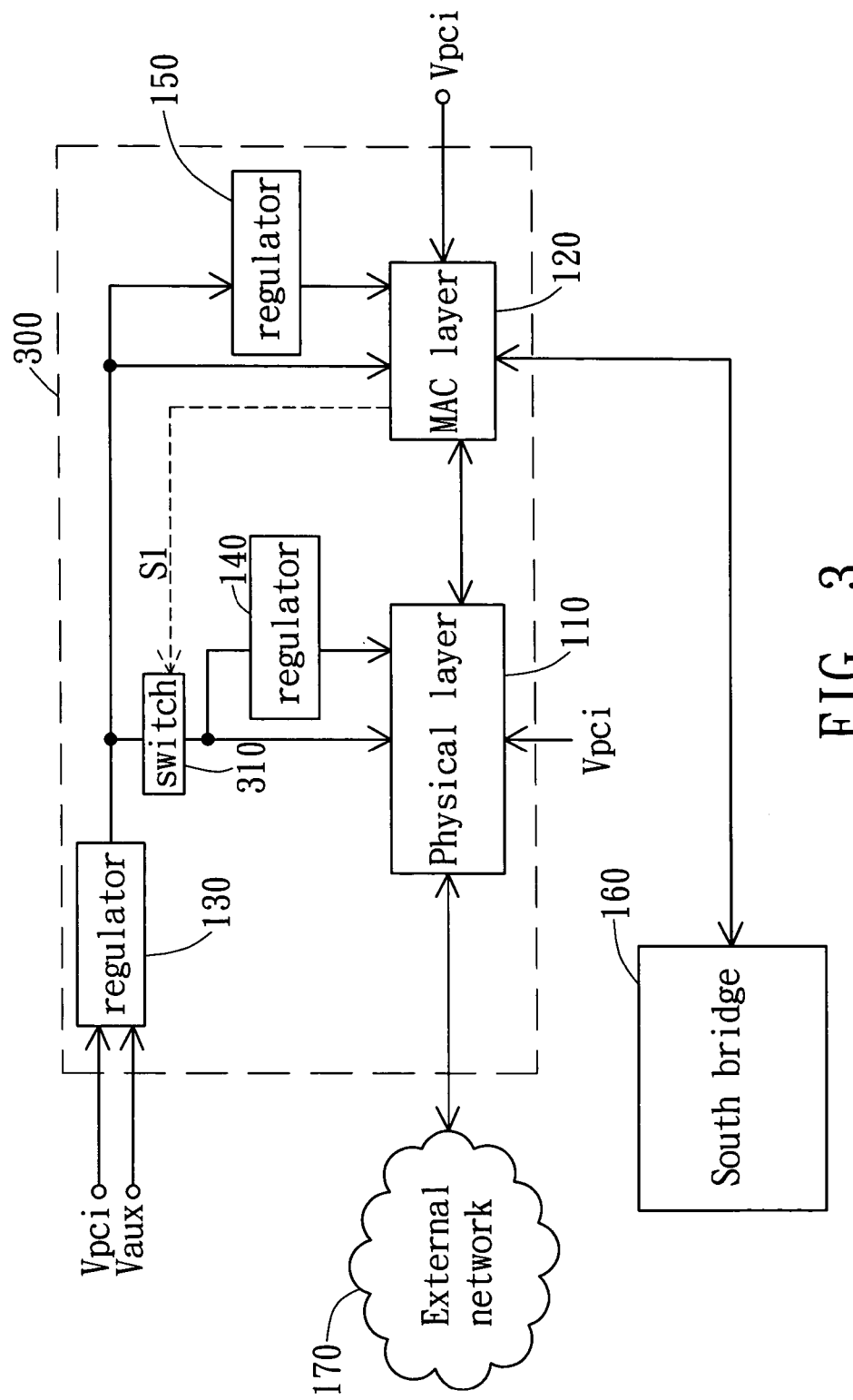
FIG. 3 is a diagram of a networking apparatus, within which the wake-on-LAN function can still work properly even in situations of improper shutdown, according to a second embodiment of the invention.

FIG. 3 is a diagram of a networking apparatus, within which the wake-on-LAN function can still work properly even in situations of improper shutdown, according to a second embodiment of the invention. The networking apparatus 300 includes at least the physical layer 110, the medium access control (MAC) layer 120, the regulators 130, 140, and 150, and a switch 310. The networking apparatus 300 communicates with the south bridge 160 of the networked device through the MAC layer 120. The MAC layer 120 communicates with the external network 170 through the physical layer 110. The switch 310 receives the output voltage from regulator 130, and outputs it to the physical layer 110 and the regulator 140. The switch 310 is set to conductive by default.

The method that the networking apparatus 300 used to detect whether the networked device is shut down properly is by the MAC layer 120 checking whether the primary power supply Vpci has dropped from the original 5V to a threshold voltage (e.g. 1V)—if yes, it means that the networked device is shutting down. The MAC layer 120 then makes the switch 310 un-conductive by a switch signal S1, and therefore, the physical layer 110 stops operating because of lost of power supply. Upon restarting, the physical layer 110 operates at the predetermined 10/100 MHz, hence the wake-on-LAN function of the networking apparatus can still work properly—the aim of the invention is achieved.

Figure 4:
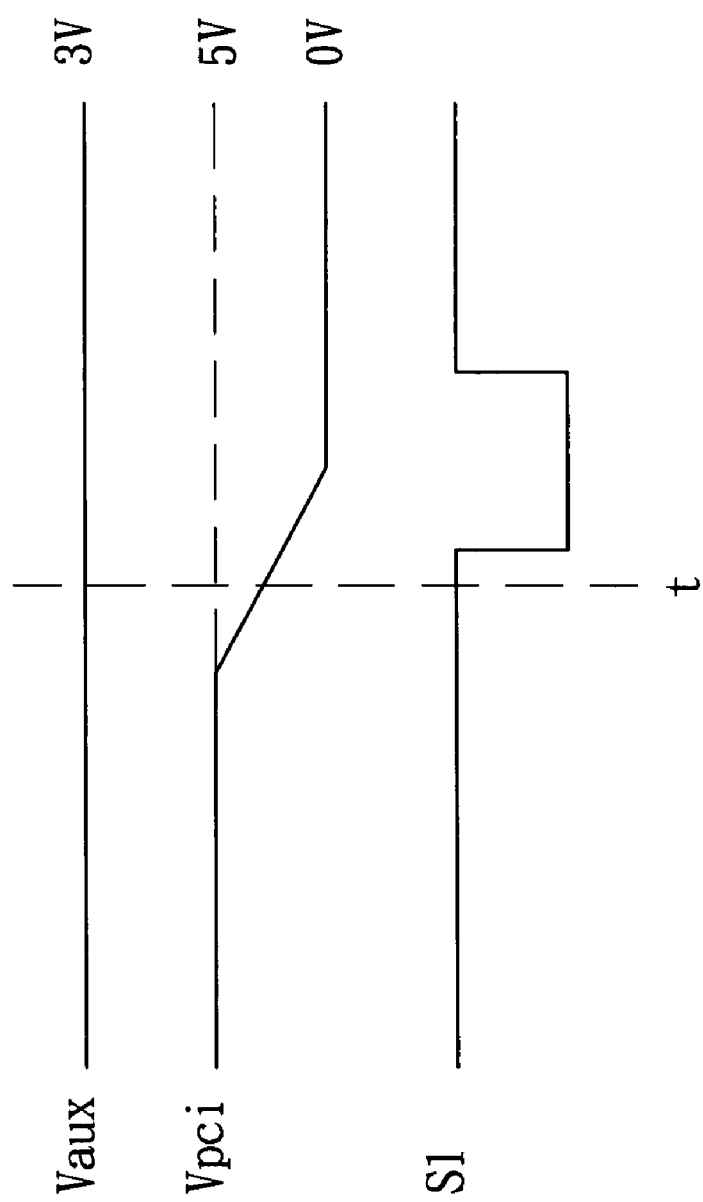
FIG. 4 is a diagram showing the voltages of the second embodiment of the networking apparatus.

FIG. 4 is a diagram showing the voltages of the second embodiment of the networking apparatus. When the networked device is on, the voltage of Vpci and Vaux are 5V and 3V respectively. When the MAC layer 120, at time point t, detects that the voltage of Vpci has dropped to a threshold voltage (e.g. 2V), which means that the networked device is shutting down, the MAC layer 120 pulls low the switch signal S1 stopping the power supply to the physical layer 110. The physical layer 110 stops operating because of lost of power supply. When the switch signal S1 is pulled high, the auxiliary power supply provides power to the physical layer 110 to be restarted. The restarted physical layer operates at the predetermined 10/100 bauds that has lower power consumption and therefore the wake-on-LAN function of the networking apparatus 300 can still work properly.

Figure 5:
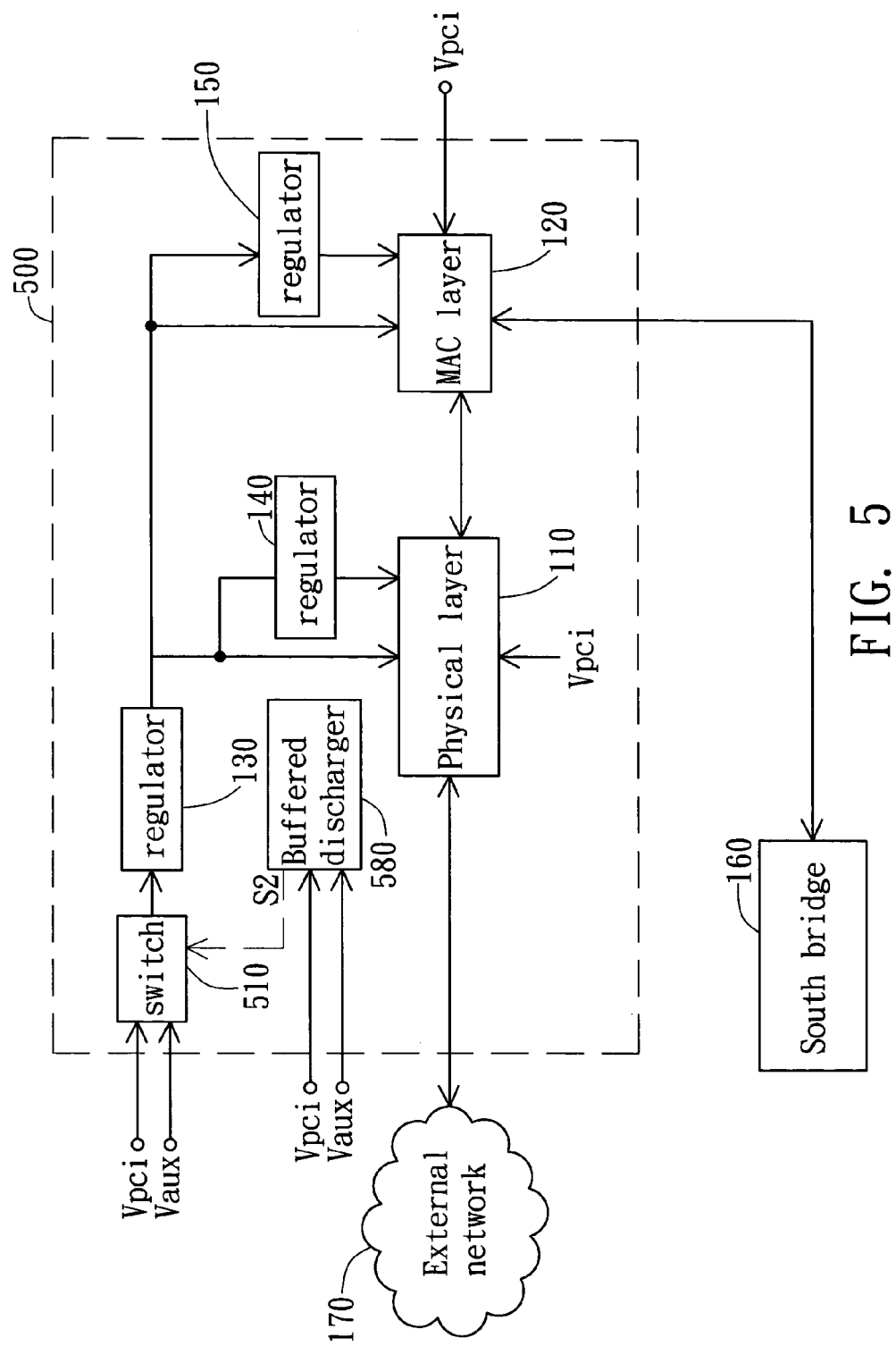
FIG. 5 is a diagram of a networking apparatus, within which the wake-on-LAN function can still work properly even in situations of improper shutdown, according to a third embodiment of the invention.

FIG. 5 is a diagram of a networking apparatus, within which the wake-on-LAN function can still work properly even in situations of improper shutdown, according to a third embodiment of the invention. The networking apparatus 500 includes at least the physical layer 110, the medium access control (MAC) layer 120, the regulators 130, 140, and 150, a switch 510, and a buffered discharger 580. The networking apparatus 500 communicates with the south bridge 160 of the networked device through the MAC layer 120. The MAC layer 120 communicates with the external network 170 through the physical layer 110. The switch 510 is used to receive the Vaux and output Vaux to the regulator 130; it is set to conductive by default. The buffered discharger is constructed by, for example, RC circuit, LC circuit, or RLC circuit. When the primary power supply Vpci exists, Vpci charges the buffered discharger 580; when Vpci does not exist, the buffered discharger 580 starts to discharge.

The method that the networking apparatus 500 used to detect whether the networked device is shutting down is that the discharger 580 checks whether the voltage of Vpci has dropped to a threshold voltage (e.g. 2.5V)—if yes, it means that the networked device is shutting down. The discharger 580 then makes the switch 510 un-conductive by a switch signal S2, consequently the physical layer 110 stops operating due to the lost power supply. The discharger 580 starts to discharge after the Vpci has dropped to a certain degree (or after a certain period of time). After the certain period of time, the switch signal S2 resets the switch to be conductive and then the auxiliary power supply Vaux can re-supply power. After the reset, the physical layer 110 operates at the predetermined 10/100 MHz bauds, and consequently the wake-on-LAN function of the networking apparatus 500 can still work properly—the aim of the invention is achieved.

Figure 6:
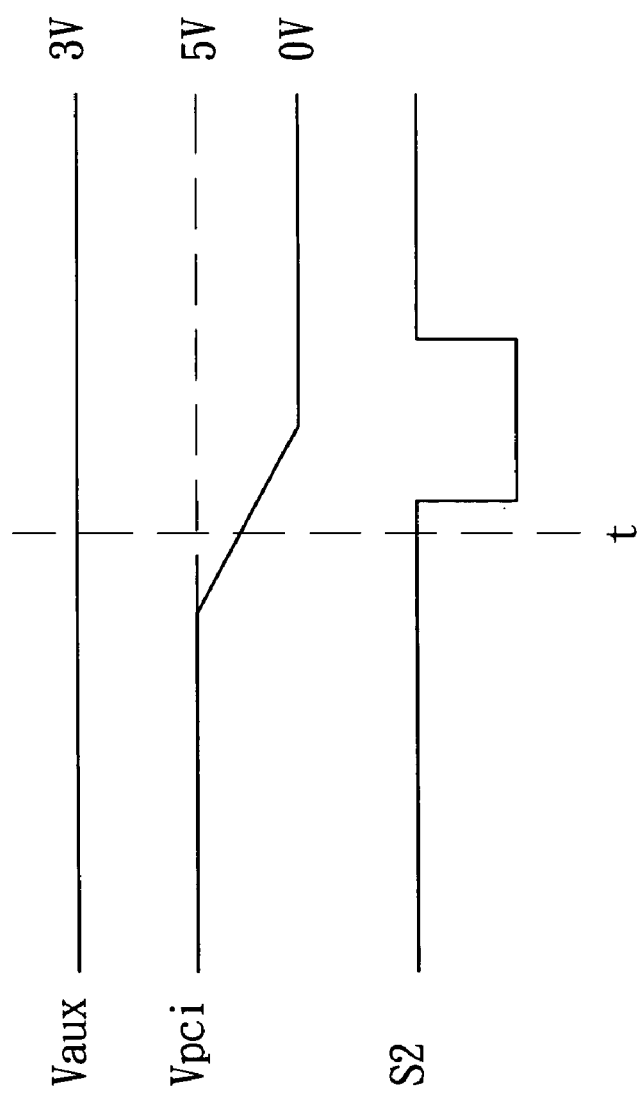
FIG. 6 is a diagram showing the voltages of the third embodiment of the networking apparatus.

FIG. 6 is a diagram showing the voltages of the third embodiment of the networking apparatus. When the networked device is on, the voltage of Vpci and Vaux are 5V and 3V respectively. When the buffered discharger 580, at the time point t, detects that the Vpci has dropped to a threshold voltage (e.g. 2.3V), which means that the networked device is shutting down, therefore the buffered discharger pulls low the switch signal S2 in order to provide power supply to the physical layer 110 and MAC layer 120. The physical layer 110 and the MAC layer 120 stop operating once their power supply is lost. At this moment, because the Vpci has gone, the buffered charger 580 starts to discharge. After the switch signal S2 is pulled high, the auxiliary power supply Vaux can re-supply power. After the reset, the physical layer 110 is operating at the predetermined 10/100 bauds that has lower power consumption, and therefore, the wake-on-LAN function of the networking apparatus 500 can still work properly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A networking apparatus, within which a wake-on-LAN function can still work properly even in situations of improper shutdown, used in a networked device, wherein when the networked device is on, a primary power supply and an auxiliary power supply are both available; when the networked device is off, only the auxiliary power supply is available, the networking apparatus comprising:
   a physical layer which is reset in response to a reset signal; and
   a medium access control (MAC) layer, for determining whether the primary power supply is lower than a threshold voltage in order to determine whether the networked device is shutting down, and for sending the reset signal to the physical layer when the MAC layer detects that the primary power supply is lower than the threshold voltage;
   wherein after the reset of the physical layer, the networking apparatus operates in a lower predetermined baud so that the wake-on-LAN function works properly even in situations of improper shutdown.

2. A networking apparatus, within which a wake-on-LAN function can still work properly even in situations of improper shutdown, used in a networked device that provides a primary power supply and an auxiliary power supply when the networked device is on, and provides the auxiliary power supply when the networked device is off, the networking apparatus comprising:
   a switch that provides power, depending on a switch signal, wherein when the networked device is on, the switch provides power from the primary power supply; and when the networked device is off, the switch provides power from the auxiliary power supply;
   a physical layer that operates depending on the power provided by the switch; and
   a medium access control (MAC) layer that operates depending on the primary and auxiliary power supply of the networked device and detects whether the primary power supply is lower than a threshold voltage so as to determine whether the networked device is shutting down;
   wherein, when the MAC layer detects that the networked device is shutting down, the MAC layer sends a switch signal to the switch so that the switch becomes un-conductive and hence unable to provide power to the physical layer and the physical layer consequently stops; after a period of time, the switch signal allows the switch to be conductive again so that power is provided to the physical layer and the physical layer is restarted and operates at a lower predetermined baud.

3. A networking apparatus, within which a wake-on-LAN function can still work properly even in situations of improper shutdown, used in a networked device that provides a primary power supply and an auxiliary power supply when the networked device is on, and provides the auxiliary power supply when the networked device is off, the networking apparatus comprising:
   a switch that provides power, depending on a switch signal, wherein when the networked device is on, the switch provides power from the primary power supply; and when the networked device is off, the switch provides power from the auxiliary power supply;
   a physical layer that operates depending on the power provided;
   a medium access control (MAC) layer that operates depending on the primary and auxiliary power supply of the networked device; and
   a buffered discharger that is charged from the primary power supply, and discharges when the primary power supply stops, and detects whether the primary power supply is lower than a threshold voltage so as to determine whether the networked device is shutting down;
   wherein, when the buffered discharger detects that the networked device is shutting down, the buffered discharger sends a switch signal to the switch so that the switch becomes un-conductive and hence unable to provide power to the physical layer and the physical layer consequently stops; after a period of time, the switch signal allows the switch to be conductive again so that power is provided to the physical layer and the physical layer is restarted and operates at a lower predetermined baud.

4. The networking apparatus according to claim 3, wherein the buffered discharger circuit comprises an RC circuit.

5. A method that allows a wake-on-LAN function to work properly even in situations of improper shutdown, used in a networking apparatus in a networked device that provides a primary power supply and an auxiliary power supply when the networked device is on, and provides the auxiliary power supply when the networked device is off, the method comprising:
   detecting whether the networked device is shutting down by checking whether the primary power supply is lower than a threshold voltage;
   if the primary power supply is lower than the threshold voltage, outputting a reset signal to a physical layer of the networking apparatus; and
   in response to the reset signal, resetting the physical layer so that the networking apparatus operates at a lower predetermined baud and the wake-on-LAN function works properly even in situations of improper shutdown.

6. A method that allows a wake-on-LAN function to work properly even in situations of improper shutdown, used in a networking apparatus in a networked device that provides a primary power supply and an auxiliary power supply when the networked device is on, and provides the auxiliary power supply when the networked device is off, the method comprising:
   detecting whether the networked device is shutting down, comprising the detection step comprises checking whether the primary power supply is lower than a threshold voltage;
   if it is detected that the primary power supply is lower than the threshold voltage,
      outputting a switch signal to cut off the power supply to a physical layer of the networking apparatus;
      using a buffered discharger to reset the physical layer so that the physical layer restarts at a lower predetermined baud; and
      outputting the switch signal in order to re-supply power to the physical layer.

* * * * *